United States Patent
Andoh

(10) Patent No.: US 7,414,797 B2
(45) Date of Patent: Aug. 19, 2008

(54) OPTICAL ELEMENT, OPTICAL SCANNING APPARATUS, AND IMAGE FORMING APPARATUS USING THE OPTICAL ELEMENT, AND METHOD AND APPARATUS FOR FIXEDLY JOINING THE OPTICAL ELEMENT AND REDUCING DEFORMATION OF THE OPTICAL ELEMENT ARRANGED IN A LAYER STRUCTURE

(75) Inventor: Fumikata Andoh, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 254 days.

(21) Appl. No.: 11/350,824

(22) Filed: Feb. 10, 2006

(65) Prior Publication Data
US 2006/0176537 A1 Aug. 10, 2006

(30) Foreign Application Priority Data
Feb. 10, 2005 (JP) ............................. 2005-034806

(51) Int. Cl.
*G02B 3/08* (2006.01)
*B32B 37/00* (2006.01)

(52) U.S. Cl. .................... 359/741; 359/796; 156/60; 264/1.7

(58) Field of Classification Search ................. 359/741, 359/796
See application file for complete search history.

(56) References Cited

U.S. PATENT DOCUMENTS

| 2003/0034110 A1* | 2/2003 | Hubel et al. .................. 156/60 |
| 2003/0041954 A1* | 3/2003 | Komori ....................... 156/196 |
| 2006/0219347 A1* | 10/2006 | Begon et al. ................... 156/99 |

FOREIGN PATENT DOCUMENTS

| JP | 04-127115 | 4/1992 |
| JP | 10-003052 | 1/1998 |
| JP | 2000-084945 | 3/2000 |
| JP | 3343491 | 8/2002 |
| JP | 2004-318024 | 11/2004 |

* cited by examiner

*Primary Examiner*—Jordan M Schwartz
(74) *Attorney, Agent, or Firm*—Oblon, Spivak, McClelland, Maier, & Neustadt, P.C.

(57) ABSTRACT

An optical element including a plurality of reference members formed on a first side surface, and a method and apparatus for fixedly joining the optical element with the first side surface facing down. The method includes providing a surface including a specific position where the optical element is placed, applying an adhesive agent to a predetermined spot within the specific position in which the optical element is placed, placing the optical element therein, causing the optical element to have convex warpage, and curing the adhesive agent. The apparatus includes mechanisms configured to apply an adhesive agent to a predetermined spot within a specific position of a surface on where the optical element is placed, and to place the optical element therein, and first and second light sources configured to cause the optical element to have convex warpage, and to cure the adhesive agent, respectively.

14 Claims, 9 Drawing Sheets

FIG. 5
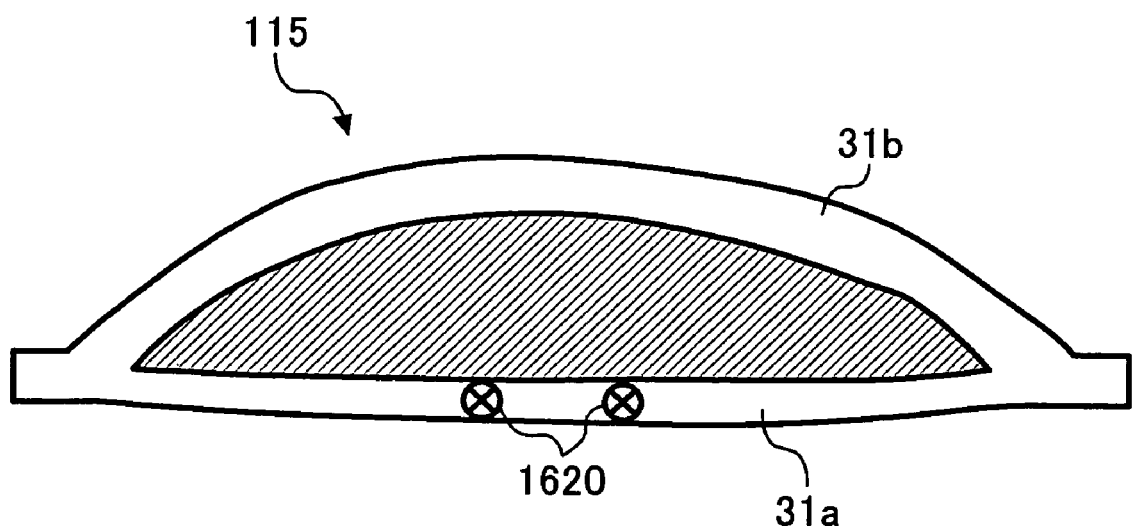
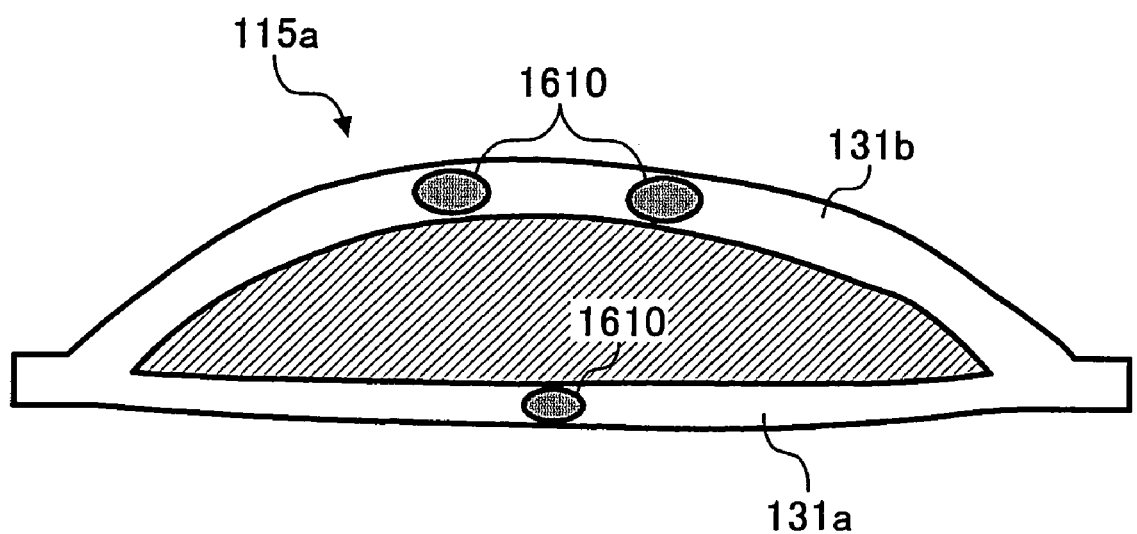

OPTICAL ELEMENT, OPTICAL SCANNING APPARATUS, AND IMAGE FORMING APPARATUS USING THE OPTICAL ELEMENT, AND METHOD AND APPARATUS FOR FIXEDLY JOINING THE OPTICAL ELEMENT AND REDUCING DEFORMATION OF THE OPTICAL ELEMENT ARRANGED IN A LAYER STRUCTURE

BACKGROUND OF THE INVENTION

1. Field of the Invention

The present invention relates to an optical element, and a method and apparatus for fixedly joining the optical element, and more particularly to an optical element, and a method and apparatus for fixedly joining the optical element capable of reducing deformation of the optical element arranged in a layer structure.

2. Discussion of the Background

In an image forming apparatus using an electrostatic copying method such as a digital copier and a laser printer, a laser beam emitted from a laser light source is polarized by a light deflecting unit to irradiate a previously uniformly charged photoconductor so that an electrostatic latent image is formed on the photoconductor. The electrostatic latent image is developed with toner into a toner image, and the toner image is transferred onto a sheet so that an image is output.

In a case a color image is formed, the image forming apparatus using the electrostatic copying method is configured and controlled as described below. A plurality of photoconductors arranged in a row in a conveyance direction of a sheet are exposed to laser light to form respective latent images on the respective photoconductors. The electrostatic latent images are then developed into toner images in respective colors (yellow, magenta, cyan, and black) corresponding to the photoconductors. The toner images are transferred onto a sheet so that the toner images are overlaid one after another to finally form a color image. The configuration and control have achieved image forming using a plurality of colors, an increase in image forming speed, and improvement in image quality.

The image forming apparatus having the above configuration and control uses a plurality of optical elements when performing optical scanning to form an electrostatic latent image. Since a large space is required to accommodate the plurality of optical elements, an optical scanning apparatus for performing the optical scanning needs to be enlarged, and the whole image forming apparatus needs to be enlarged, accordingly.

Against the above background, space saving efforts have been made by arranging optical elements such as imaging lenses provided for respective colors into a layer structure.

A background art for arranging the optical elements in a layer structure uses a lens holder for integrally structuring two imaging lenses in a layered arrangement in a sub-scanning direction.

A background method of holding optical elements places a plurality of elongated optical elements one on another with opposite ends supported. One of the optical elements includes a protrusion arranged at a center in a longitudinal direction of the optical element, and the other optical element includes a receiving concavity arranged in a position opposing the protrusion. When the optical elements are placed, the optical elements are positioned by engaging the protrusion with the receiving concavity.

SUMMARY OF THE INVENTION

This patent specification describes an optical element including a plurality of reference members formed in a cylinder-like shape with a flat top on a first side surface perpendicular to a light incident surface, and a method and apparatus for fixedly joining the optical element. The method includes providing a surface including a specific position on which the optical element is placed, applying an adhesive agent to a predetermined spot within the specific position of the surface on which the optical element is placed, placing the optical element with the first side surface facing down into the specific position of the surface, causing the optical element placed in the specific position to have convex warpage relative to the surface, and curing the adhesive agent. The apparatus includes mechanisms configured to apply an adhesive agent to a predetermined spot within a specific position of a surface on which the optical element is placed, and place the optical element with the first side surface facing down into the specific position of the surface, and first and second light sources configured to cause the optical element placed in the specific position to have convex warpage relative to the surface, and to cure the adhesive agent, respectively.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is a schematic illustration for explaining spot light positions of UV rays emitted from light sources for a forced deformation of the optical element;

DETAILED DESCRIPTION OF THE PREFERRED EMBODIMENTS

Figure 1:
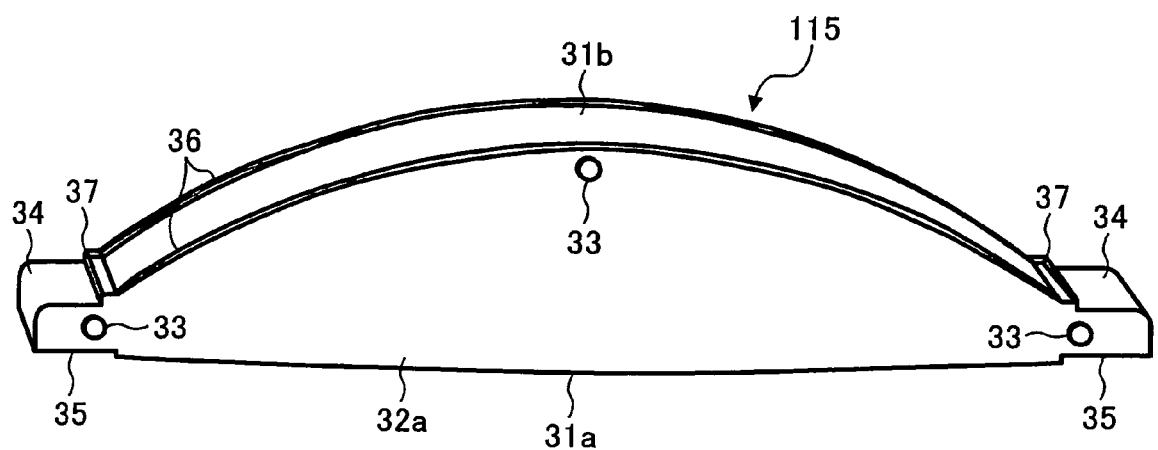
FIG. 1 is a schematic illustration of an optical element according to an embodiment of the present invention, viewed from a first lens surface.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 2:
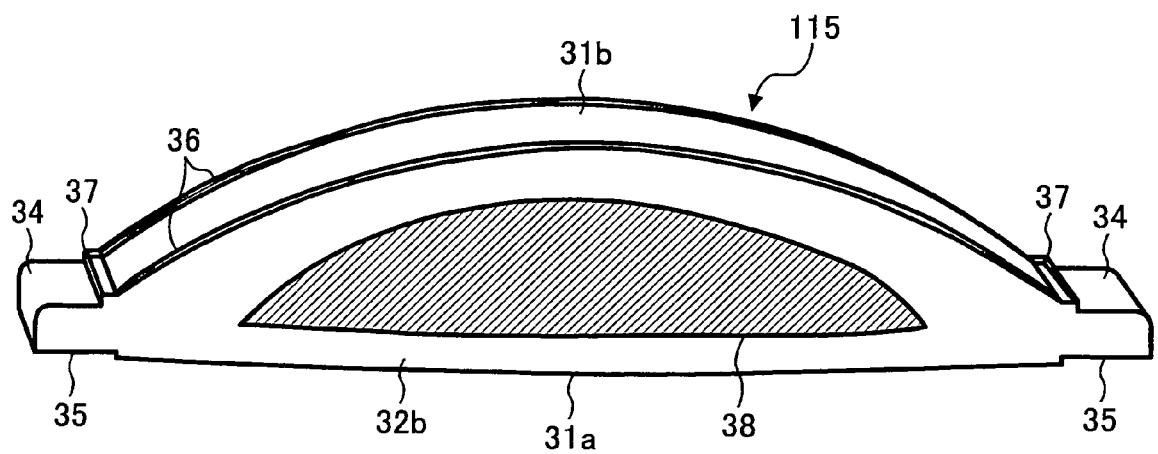
FIG. 2 is another schematic illustration of the optical element in FIG. 1 viewed from a second lens surface.

Referring now to the drawings, wherein like reference numerals designate identical or corresponding parts throughout the several views, particularly to FIGS. 1 and 2, an optical element 115 is described.

As shown in FIGS. 1 and 2, the optical element 115 includes a first lens surface 31a, a second lens surface 31b, transfer surfaces 32a and 32b, bosses 33, flanges 34, mounting reference surfaces 35, outer ribs 36, reference ribs 37, and an incompletely transferred surface 38.

The optical element 115 is formed of a plastic material in an elongated shape having the first lens surface 31a and the second lens surface 31b. The second lens surface 31b is curved so that the optical element 115 has a thicker portion at a center in a longitudinal direction thereof.

The transfer surfaces 32a and 32b include flat surfaces arranged at opposite sides extended between the first and second lens surfaces 31a and 31b so as to be in parallel to each other in a beam transmission direction. The transfer surface 32a is provided with three bosses 33 each having a cylindrically protruding shape and a flat top. One of the bosses 33 is formed at a center in a longitudinal direction of the transfer surface 32a. The other two of the bosses 33 are formed at respective sides in the longitudinal direction of the transfer surface 32a. The bosses 33 are thereby triangularly positioned and can evenly support a weight of the optical element 115. The transfer surface 32b includes the incompletely transferred surface 38 having a concave shape in a longitudinal direction thereof, i.e. has a troffer-like-round shape.

The optical element 115 includes the flanges 34 at opposite sides in the longitudinal direction thereof. The mounting reference surfaces 35 are flat surfaces for serving as references upon mounting and are formed on undersides of the flanges 34. The outer ribs 36 are formed on opposite sides in a transversal direction and on opposite sides in a longitudinal direction of the second lens surface 31b. Further, reference ribs 37 protruding higher than the outer ribs 36 are formed on the both sides in the longitudinal direction of the second lens surface 31b to improve accuracy in positioning in the longitudinal direction of the optical element 115.

The optical element 115 of the embodiment is formed according to a combination of a background method of injection separation molding and a background method of air-induced sink molding. Specifically, after a resin in a cavity is caused to generate pressure to transfer a transfer surface by the method of injection separation molding, local contraction for releasing is caused against a shape of the captivity to form a recess shape of an incompletely transferred portion. Then, a difference in pressure or air pressure is generated between a mirror surface region corresponding to a mirror surface of a molding material and a vent hole region corresponding to a vent hole to generate sinkage in the vent hole region so that an optical element having a highly accurate lens surface is molded without any distortion inside thereof.

Figure 3A:
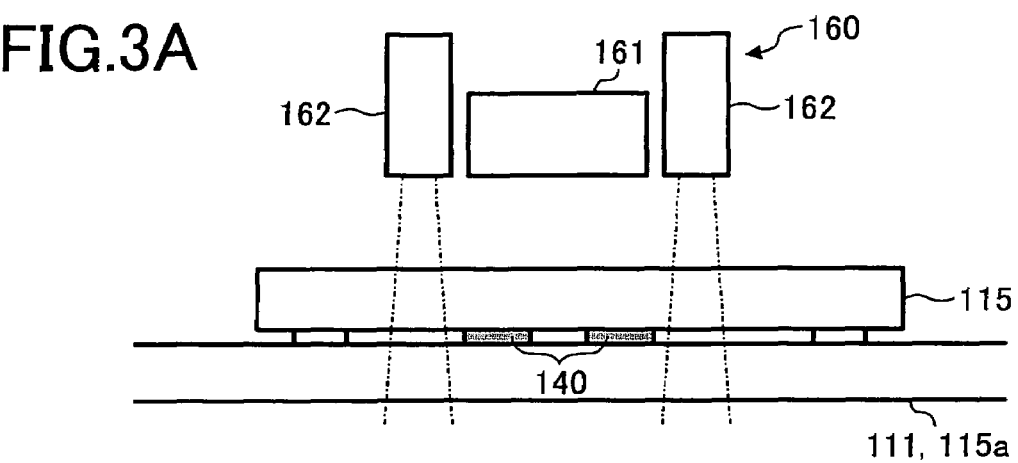
FIGS. 3A, 3B, and 3C are schematic illustrations for explaining a method of fixedly joining the optical element according to the embodiment of the present invention.
Figure 3B:
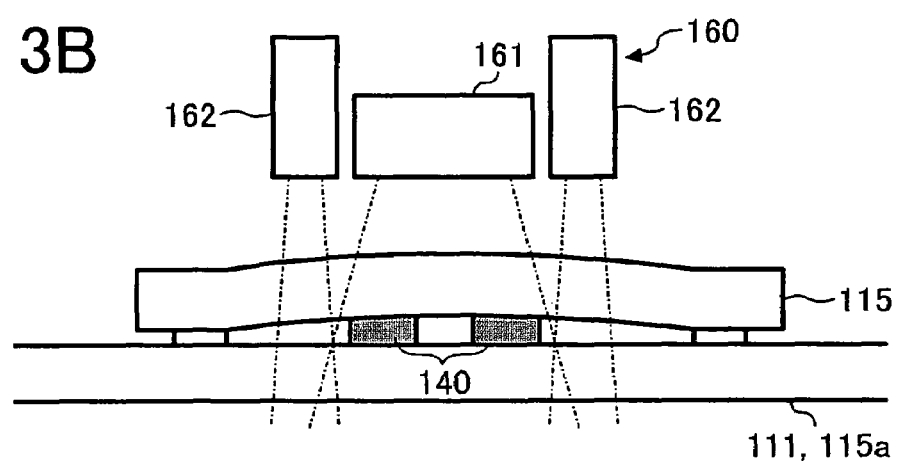
Figure 3C:
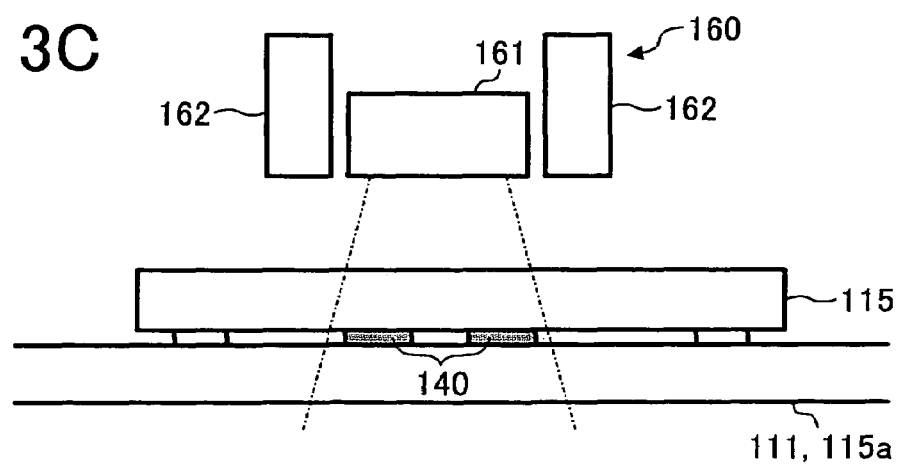
Figure 4:
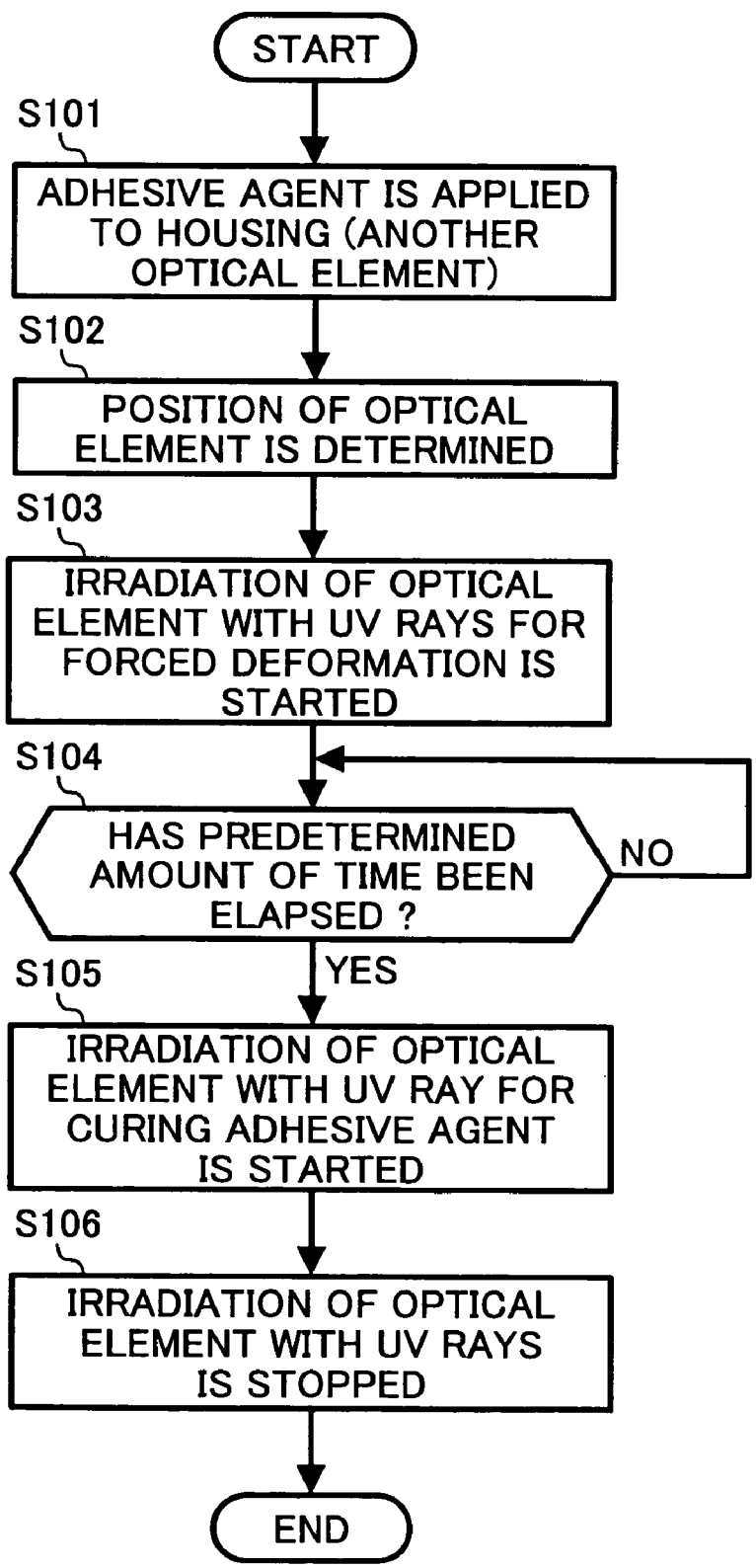
FIG. 4 is a flowchart of steps included in the method of fixedly joining the optical element.

A method of fixedly joining the optical element 115 to a selected one of a housing of an optical scanning apparatus and another optical element according to the embodiment of the present invention is described below referring to FIGS. 3A, 3B, 3C, and 4. FIGS. 3A, 3B, and 3C are schematic illustrations for explaining the method of fixedly joining the optical element 115. FIG. 4 is a flowchart of steps included in the method of fixedly joining the optical element 115.

As illustrated in FIGS. 3A, 3B, and 3C, a light source unit 160 includes a light source 161 for curing an adhesive agent 140, and light sources 162 for forced deforming the optical element 115. The optical element 115 is fixedly joined to a surface of a selected one of a housing 111 of an optical scanning apparatus or another optical element 115a by using the adhesive agent 140.

When the optical element 115 is fixedly joined to the selected one of the housing 111 of the optical scanning apparatus or the optical element 115a, at first, the adhesive agent (i.e. UV curing adhesive) 140 is applied to a plurality of spots on the selected one of the housing 111 or the optical element 115a (step S101). Next, a mounting position of the optical element 115 is determined based on the reference surfaces 35 and the reference ribs 37 shown in FIGS. 1 and 2 (step S102). Then, irradiation of the optical element 115 with ultraviolet (UV) rays emitted from the light sources 162 for forced deforming the optical element 115 as shown in FIG. 3A is started so that the optical element 115 has convex warpage as shown in FIG. 3B (step S103) relative to the surface of the selected one of the housing 111 or the optical element 115a. After the irradiation is started, a judgment is made on whether a predetermined amount of time has been elapsed (step S104). When it is judged that the predetermined amount of time has been elapsed (Yes in step S104), irradiation of the optical element 115 with an ultraviolet (UV) ray emitted from the light source 161 for curing the adhesive agent 140 as shown in FIG. 3C is started (step S105). When it is judged that the predetermined amount of time has not been elapsed (No in step S104), the irradiation of the optical element 115 with the ultraviolet (UV) rays emitted from the light sources 162 for forced deforming the optical element 115 is continued. Finally, the irradiation of the optical element 115 with the UV rays emitted from the light sources 161 and 162 is stopped (step S106).

In step S104, although the judgment is made on whether the predetermined amount of time has been elapsed in the embodiment, the judgment instead may be made on whether a predetermined amount of deformation of the convex warpage has occurred in the optical element 115.

Further, although the irradiation of the optical element 115 with the UV rays emitted from the light sources 161 and 162 is stopped in step S106 in the embodiment, the irradiation of the optical element 115 with the UV rays emitted from the light sources 162 may be stopped in step S106 instead, and the irradiation of the optical element 115 with the UV ray emitted from the light source 161 may be stopped at a later step (not shown).

In the embodiment of the present invention, since the optical element 115 includes the three bosses (reference protrusions) each having the cylindrical shape and the flat top, the optical element 115 can have a selected one of convex warpage and concave warpage.

FIG. 5 is a schematic illustration for explaining spot positions of the UV rays emitted from the light sources 162 for forced deformation of the optical element 115 when the optical element 115 is fixedly joined to the another optical element 115a, i.e. when the surface on which the optical element is placed is a surface of another optical element 115a. The optical element 115 includes the first lens surface 31a, the second lends surface 31b, and areas 1620. The other optical element 115a includes a first lens surface 131a, a second lens surface 131b, and areas 1610 to which the adhesive agent 140 is applied. The areas 1610 are irradiated with the UV ray for curing the adhesive agent 140. The areas 1620 are irradiated with the UV rays for forced deforming the optical element 115. The areas 1620 are adjacent to an area where most significant warpage occurs by an action of curing and contraction of the adhesive agent 140, and are located in areas where the irradiation does not affect the adhesive agent 140. Specifically, as shown in FIG. 5, the two areas 1620 are adjacent to one of the three areas 1610 which is located in the middle of the first lens surface 131a in a longitudinal direction thereof so that the convex warpage of the optical element 115 can be stably caused.

The amount of deformation having convex warpage can be controlled by changing the strength of the irradiation with the UV rays from the light sources 162 for forced deformation of the optical element 115 as a difference in temperatures of a top surface and an undersurface of the optical element 115 can be adjusted by the change. Further, a desired amount of warpage can be achieved by adjusting the timing and durations of the irradiation of the optical element 115 with the UV rays from the light sources 161 and 162.

Further, the fixed-joining of the optical element 115 can be finished in a short time by intensively irradiating the optical element 115 with the same levels of UV rays from the light sources 162 for forced deformation since the convex warpage can be achieved in a short time.

Figure 6:
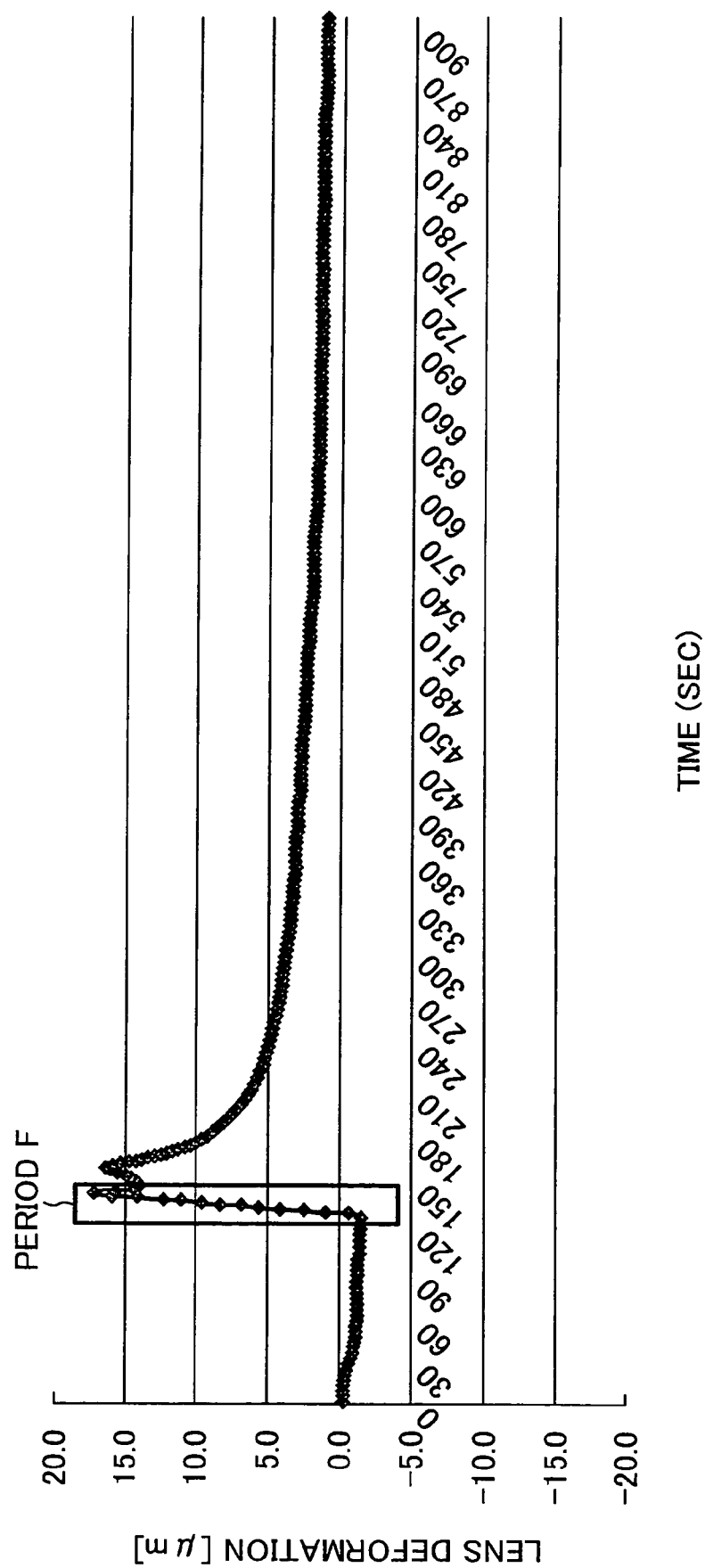
FIG. 6 is a graphical representation of shifts in amounts of the deformation of the optical element.

FIG. 6 is a graphical representation of shifts in amounts of deformation of the optical element 115. In FIG. 6, an x-axis represents an amount of time elapsed after the fixed-joining of the optical element 115 is started while a y-axis represents an amount of lens deformation of the optical element 115. A period F represents a period of time over which the optical element 115 is deformed to have convex warpage by being irradiated with the UV rays emitted from the light sources 162 for forced deformation. As shown in FIG. 6, because the optical element 115 is fixedly joined to the selected one of the housing 111 or the optical element 115a after the optical element 115 has achieved the convex warpage in the period F, concave warpage due to curing and contraction of the adhesive agent 140 can be reduced. Therefore, the amount of deformation before and after the fixed-joining of the optical element 115 can be reduced. As a result, the optical element 115 has less deformation and mounting posture, thereby maintaining a good optical property.

Although the optical element 115 is forcibly deformed by using heat radiated by the irradiation with the UV rays emitted from the light sources 162 in the embodiment of the present invention, the optical element 115 may be physically deformed by using a pressurizing member instead.

Although UV light sources for emitting UV rays are used as the light source 161 for curing the adhesive agent 140 and the light sources 162 for forced deformation of the optical element 115 in the embodiment, the light sources are not limited to UV light sources. Further, a heat source is not limited to light, and a heating element capable of locally applying heat may be used.

The optical element 115 is preferably formed of a plastic material so that the convex warpage can be achieved in a short time (several seconds), and the fixed-joining of the optical element 115 can be finished in a short time.

Figure 7:
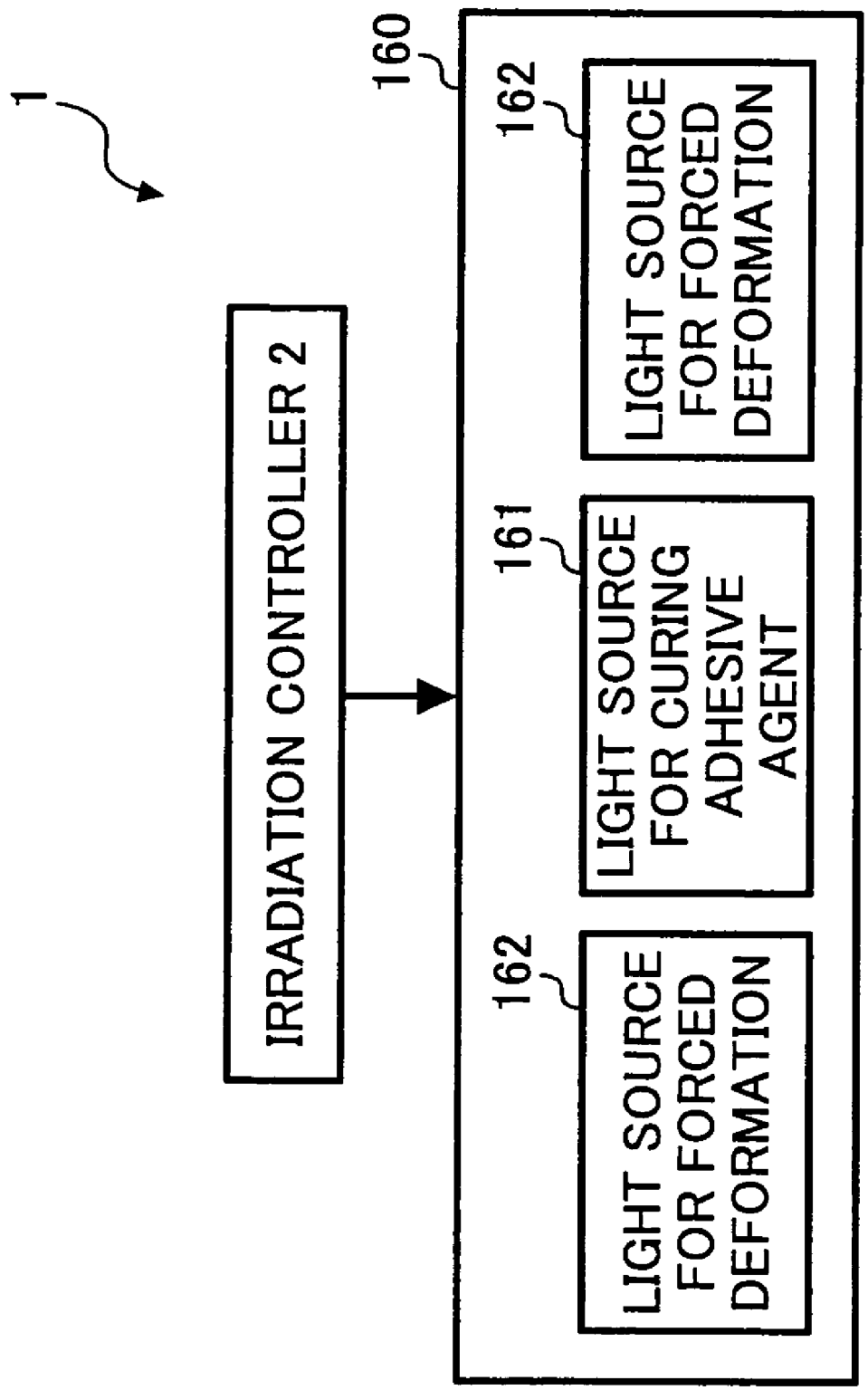
FIG. 7 is a schematic diagram of a general configuration of an apparatus for fixedly joining the optical element.

FIG. 7 is a schematic diagram of a general configuration of an apparatus for fixedly joining the optical element 115 to the selected one of the housing 111 or the optical element 115a according to the embodiment of the present invention. As shown in FIG. 7, an apparatus 1 for fixedly joining includes an irradiation controller 2 and the light source unit 160. The light source unit 160 includes the light source 161 for curing the adhesive agent 140 and the light sources 162 for forced deforming the optical element 115. The irradiation controller 2 controls the irradiation of the optical element 115 with the UV rays from the light sources 161 and 162. By using the apparatus 1 having the configuration shown in FIG. 7, the fixed-joining of the optical element 115 according to the embodiment can be performed with high accuracy in a short time.

Figure 8:
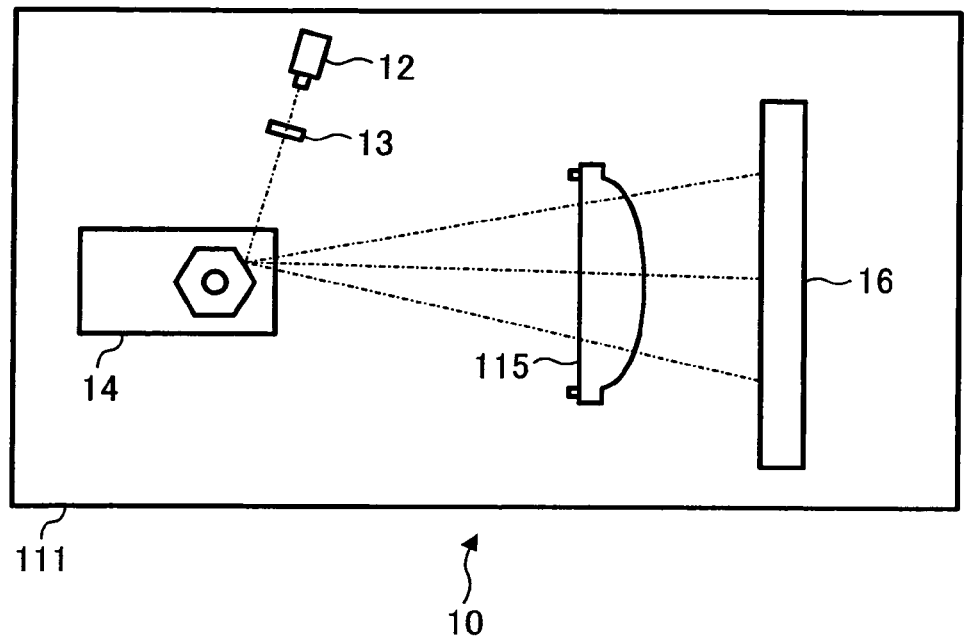
FIG. 8 is a top view of an optical scanning apparatus having the optical element fixedly joined according to the embodiment of the present invention.
Figure 9:
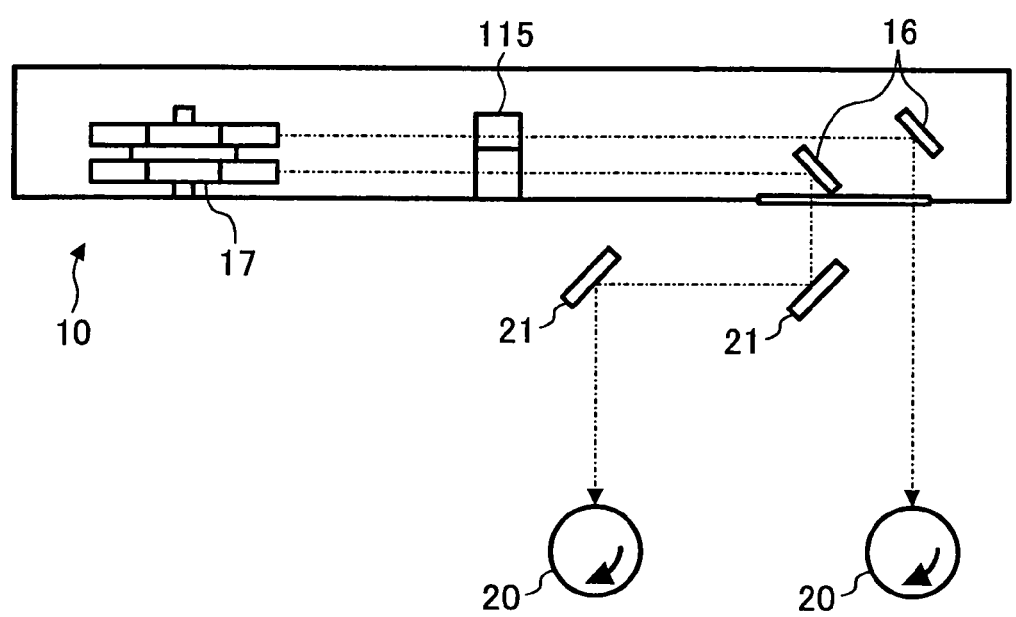
FIG. 9 is a side view of the optical scanning apparatus shown in FIG. 8.

Next, a general configuration of the optical scanning apparatus having the optical element 115 fixedly joined according to the embodiment of the present invention is described below referring to FIGS. 8 and 9. FIG. 8 is a top view of an optical scanning apparatus 10. FIG. 9 is a side view of the optical scanning apparatus 10. As shown in FIGS. 8 and 9, the optical scanning apparatus 10 includes a laser light source 12, a cylindrical lens 13, a polygon scanner unit 14, a reflex mirror 16, a polygon mirror 17, photoconductors 20, reflecting mirrors 21, the housing 111, and the optical element 115.

The housing 111 serves as a platform of the optical scanning apparatus 10, and is formed of a resin material. The laser light source 12 includes a selected one of a single semiconductor and a plurality of semiconductors, and emits laser light to irradiate the photoconductors 20 disposed outside the optical scanning apparatus 10 to form electrostatic latent images thereon. The cylindrical lens 13 formats the laser light emitted from the laser light source 12. The polygon scanner unit 14 is a polariscope to polarize the formatted laser light at a constant angular velocity. The optical element 115 is, for example, an imaging lens such as an fθ lens to perform an imaging and a constant velocity scanning with the laser light polarized by the polygon scanner unit 14. The reflex mirror 16 reflects the laser light to be guided to the photoconductors 20 disposed outside the optical scanning apparatus 10.

In the optical scanning apparatus 10 according to the embodiment, the laser light emitted from the laser light source 12 is gathered into the polygon scanner unit 14. The laser light is polarized by the polygon mirror 17 provided in the polygon scanner unit 14 into a main scanning direction at the constant angular velocity. The polarized laser light is impinged on the photoconductors 20 via the optical elements 115 overlaid in the same position, the reflex mirrors 16, the reflecting mirrors 21, and so forth, to write images thereon.

A configuration of the optical scanning apparatus 10 is not limited to the configuration described above referring to FIGS. 8 and 9. Another configuration of the optical scanning apparatus having the optical element 115 fixedly joined according to the embodiment of the present invention is described below referring to FIGS. 10 and 11.

Figure 10:
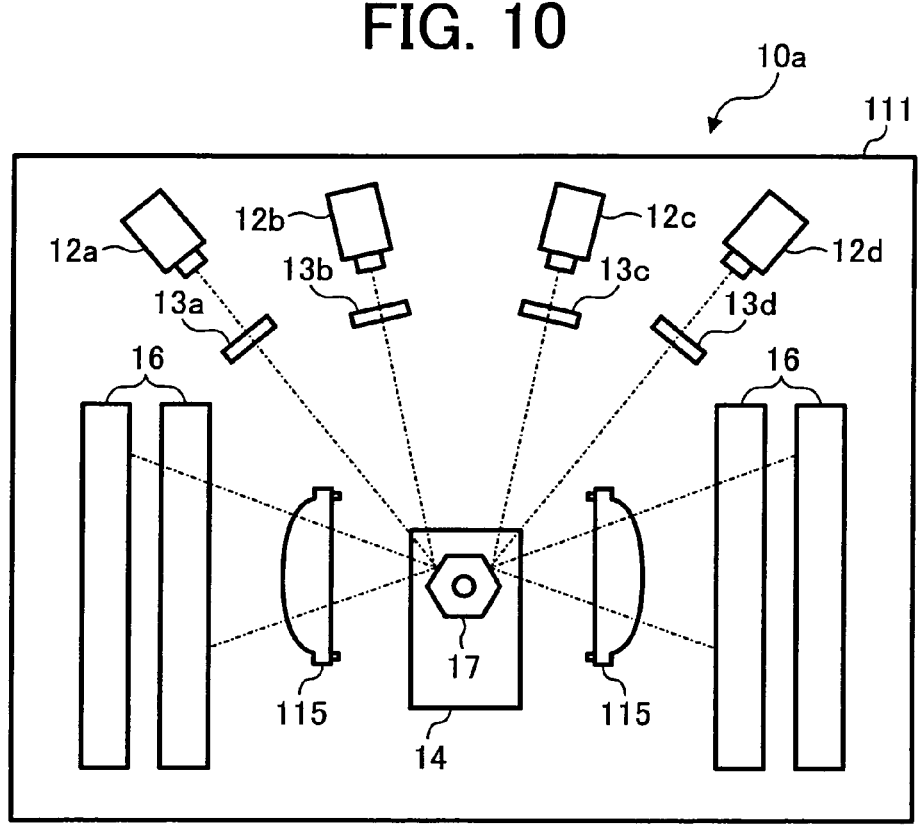
FIG. 10 is a top view of another optical scanning apparatus having the optical element fixedly joined according to the embodiment of the present invention.
Figure 11:
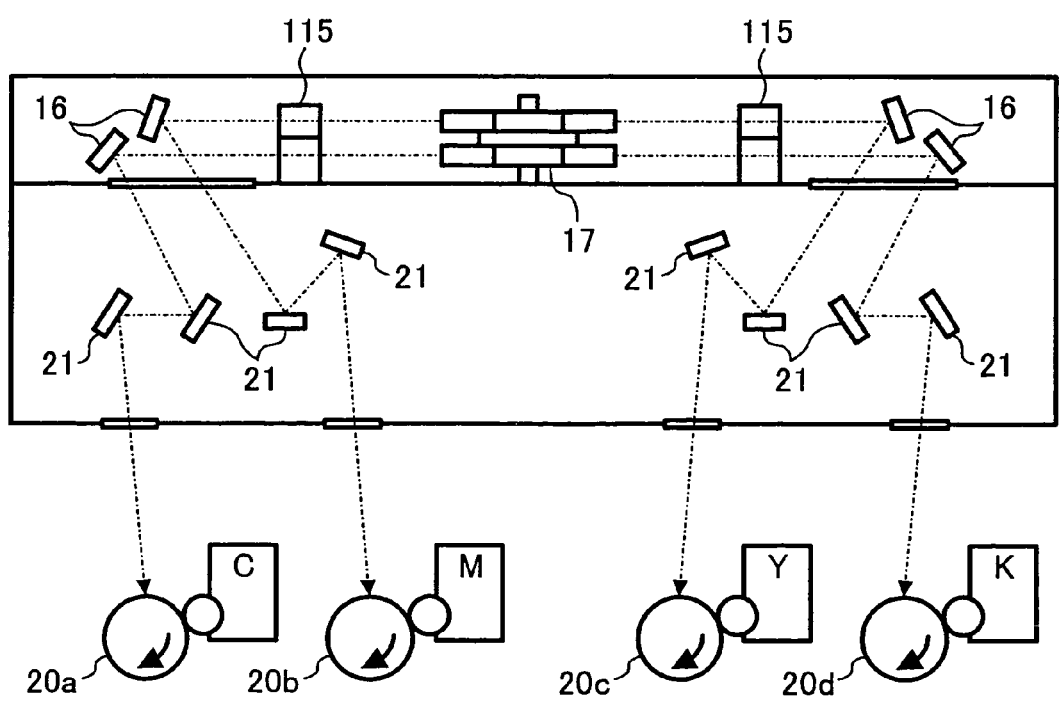
FIG. 11 is a side view of the optical scanning apparatus shown in FIG. 10.

FIG. 10 is a top view of an optical scanning apparatus 10a having a configuration for color image forming using a plurality of toner images in respective colors. FIG. 11 is a side view of the optical scanning apparatus 10a shown in FIG. 10.

As shown in FIGS. 10 and 11, the optical scanning apparatus 10a includes a plurality of laser light sources 12a, 12b, 12c, and 12d, a plurality of cylindrical lens 13a, 13b, 13c, and 13d, and a plurality of photoconductors 20a, 20b, 20c, and 20d. The optical scanning apparatus 10a further includes the polygon scanner unit 14, the reflex mirrors 16, the polygon mirror 17, the reflecting mirrors 21, the housing 111, and the optical elements 115, corresponding to those shown in FIGS. 8 and 9.

The plurality of laser sources 12a to 12d emit laser light to form electrostatic latent images for respective colors on corresponding ones of the plurality of photoconductors 20a to 20d. The cylindrical lenses 13a to 13d are provided for the laser light sources 12a to 12d, respectively. The laser light emitted from the laser sources 12a to 12d is polarized by the polygon scanner unit 14. The polarized laser light is impinged on the photoconductors 20a to 20d via the overlaid optical elements 115 arranged at positions opposed to the polygon scanner unit 14 so as to correspond to respective laser light sources 12a to 12d, the reflex mirrors 16, the reflecting mirrors 21, and so forth, to write images thereon.

Figure 12:
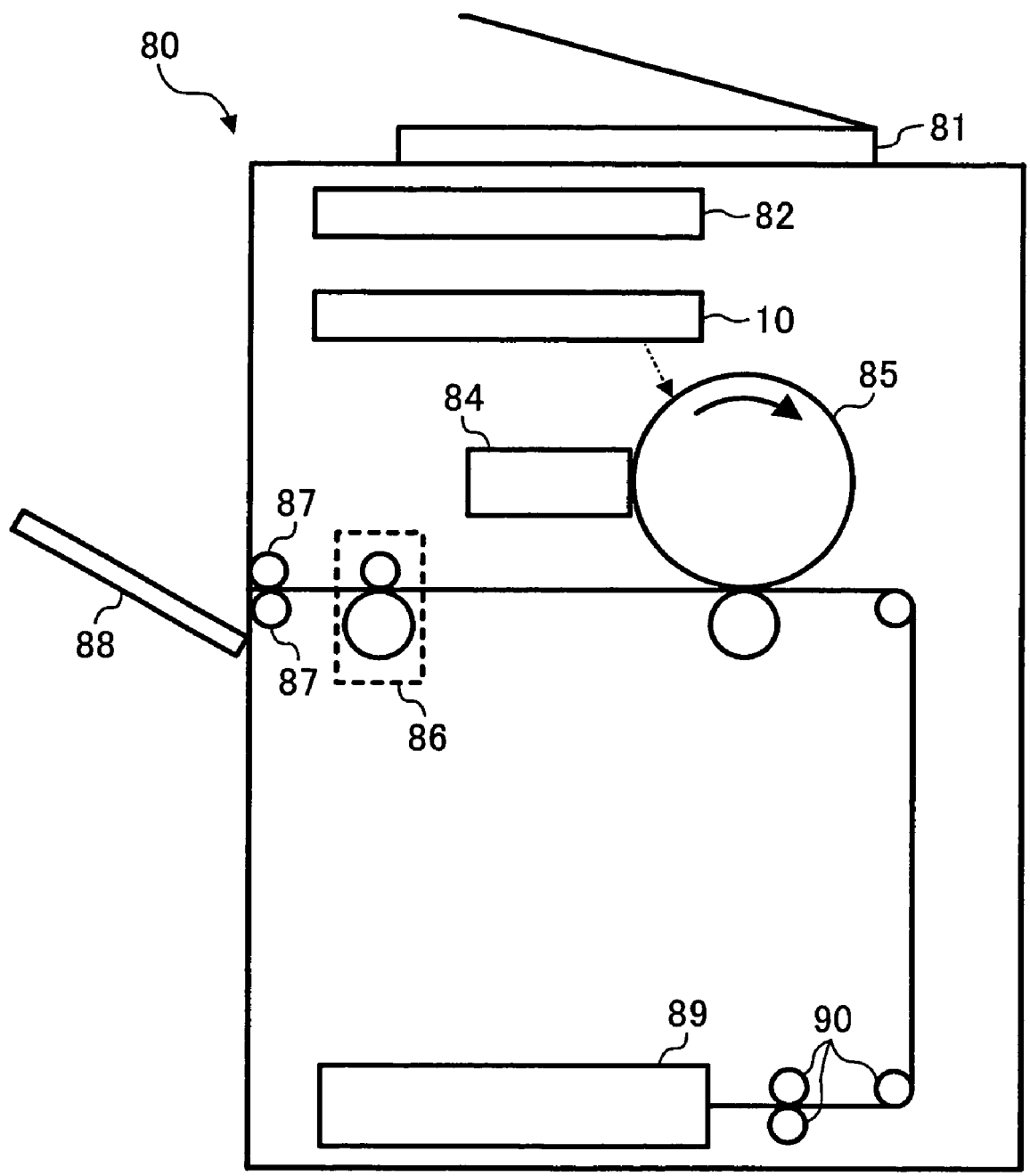
FIG. 12 is a schematic illustration of a general configuration of an image forming apparatus including the optical scanning apparatus according to the embodiment of the present invention.

Next, an image forming apparatus including the optical scanning apparatus having the optical element fixedly joined according to the embodiment of the present invention is described below referring to FIG. 12. FIG. 12 is a schematic illustration of a general configuration of an image forming apparatus 80 including the optical scanning apparatus 10 according to the present invention. As shown in FIG. 12, the image forming apparatus 80 includes the optical scanning apparatus 10, an exposure glass 81, a reading device 82, a development unit 84, a photoconductor 85, a fixing unit 86, sheet discharging rollers 87, a sheet discharging tray 88, a sheet feeding tray 89, and sheet feeding rollers 90.

The reading device 82 reads image data from an original placed on the exposure glass 81, and sends an image signal representing the read image data to the optical scanning apparatus 10. The optical scanning apparatus 10 emits laser light for writing according to the image signal to irradiate the photoconductor 85 therewith so that an electrostatic latent image is formed on the photoconductor 85. The development unit 84 develops the electrostatic latent image formed on the photoconductor 85 into a toner image. The toner image is transferred onto a sheet conveyed from the sheet feeding tray 89 by the sheet feeding rollers 90. The fixing unit 86 applies heat to the sheet to fix the transferred toner image on the sheet. The sheet having the fixed toner image is discharged into the sheet discharging tray 88 via the sheet discharging rollers 87.

The image forming apparatus 80 may include the optical scanning apparatus 10a instead of the optical scanning apparatus 10 with another configuration corresponding to the optical scanning apparatus 10a.

Since the image forming apparatus includes the optical element 115 which has a small amount of deformation because the optical element 115 has been fixedly joined by the method of fixedly joining according to the embodiment of the present invention, the image forming apparatus 80 can perform excellent optical scanning by maintaining a good optical property. As a result, the image forming apparatus 80 is capable of forming an image having intended image quality.

Numerous additional modifications and variations are possible in light of the above teachings. It is therefore to be understood that within the scope of the appended claims, the disclosure of this patent specification may be practiced otherwise than as specifically described herein.

This patent specification is based on a Japanese patent application, No. JP2005-034806 filed on Feb. 10, 2005 in the Japan Patent Office, the entire contents of which are hereby incorporated by reference herein.

What is claimed as new and desired to be secured by Letters Patent of the United States is:

1. A method of fixedly joining an optical element comprising:
   providing a plurality of reference members formed on a first side surface of said optical element perpendicular to a light incident surface;
   providing a surface including a specific position on which the optical element is placed;
   applying an adhesive agent to a predetermined spot within the specific position of the surface on which the optical element is placed;
   placing the optical element with the first side surface facing down into the specific position of the surface;
   intentionally causing the optical element placed in the specific position to have convex warpage relative to the surface; and
   curing the adhesive agent.

2. The method of fixedly joining the optical element according to claim 1, wherein the surface is a part of a support for supporting the optical element when the optical element is an optical element first placed and providing a second side; surface opposite and in parallel to the first side surface when the optical element is an optical element following a proceeding placement of another optical element.

3. The method of fixedly joining the optical element according to claim 1, wherein the causing the convex warpage causes the optical element to have the convex warpage by generating a difference in temperatures between the first side surface and a second side surface of the placed optical element.

4. The method of fixedly joining the optical element according to claim 3, wherein the difference in temperatures between the first side surface and the second side surface of the optical element is generated by raising the temperature of the second side surface of the optical element with heat generated by light emitted from a first light source.

5. The method of fixedly joining the optical element according to claim 4, wherein the light is emitted from the first light source to locally irradiate with the light only where the adhesive agent is not to be applied and most significant concave warpage is caused by curing and contraction of the adhesive agent.

6. The method of fixedly joining the optical element according to claim 5, wherein the light is emitted from the first light source for the irradiation at a predetermined intensity.

7. The method of fixedly joining the optical element according to claim 5, wherein the light is emitted from the first light source to irradiate with the light two spots adjacent to an area where the adhesive agent is to be applied, arranged on an opposite side to each other along a longitudinal direction of the optical element.

8. The method of fixedly joining the optical element according to claim 7, wherein the light is emitted from the first light source to irradiate with the light at a predetermined intensity the two spots adjacent to the area where the adhesive agent is to be applied.

9. The method of fixedly joining the optical element according to claim 4, wherein the light emitted from the first light source is an ultraviolet ray.

10. The method of fixedly joining the optical element according to claim 1, wherein the causing the convex warpage causes the optical element to have the convex warpage by applying pressure to the optical element when the optical element is placed.

11. The method of fixedly joining the optical element according to claim 1, wherein the adhesive agent is cured by being irradiated with an ultraviolet ray, and the curing is performed by emitting an ultraviolet ray from a second light source to irradiate with the ultraviolet ray where the adhesive agent is applied.

12. The method of fixedly joining the optical element according to claim 1, wherein the surface is part of a housing of an optical scanning apparatus.

13. The method of fixedly joining the optical element according to claim 1, wherein the surface is a surface of another optical element.

14. An optical element formed by a method comprising:

providing a plurality of reference members formed on a first side surface of said optical element perpendicular to a light incident surface;

providing a surface including a specific position on which the optical element is placed;

applying an adhesive agent to a predetermined spot within the specific position of the surface on which the optical element is placed;

placing the optical element with the first side surface facing down into the specific position of the surface;

intentionally causing the optical element placed in the specific position to have convex warpage relative to the surface; and curing the adhesive agent.

* * * * *